US009692845B2

(12) United States Patent
Lassborn et al.

(10) Patent No.: US 9,692,845 B2
(45) Date of Patent: Jun. 27, 2017

(54) PERMANENT PRESENCE FOR POLITE BLOCK AND CONFIRM

(75) Inventors: Sofie Lassborn, Sollentuna (SE); Mikael Klein, Huddinge (SE); Anders Lindgren, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1180 days.

(21) Appl. No.: 12/810,356

(22) PCT Filed: Dec. 21, 2007

(86) PCT No.: PCT/SE2007/051072
§ 371 (c)(1),
(2), (4) Date: Jun. 24, 2010

(87) PCT Pub. No.: WO2009/082308
PCT Pub. Date: Jul. 2, 2009

(65) Prior Publication Data
US 2010/0281109 A1    Nov. 4, 2010

(51) Int. Cl.
*G06F 15/16* (2006.01)
*H04L 29/08* (2006.01)
*H04M 7/00* (2006.01)
*H04L 29/06* (2006.01)

(52) U.S. Cl.
CPC .......... *H04L 67/24* (2013.01); *H04M 7/0093* (2013.01); *H04L 65/1006* (2013.01); *H04L 67/26* (2013.01); *H04M 2203/6009* (2013.01)

(58) Field of Classification Search
USPC ...................................... 709/203; 707/999.01
See application file for complete search history.

(56) References Cited

U.S. PATENT DOCUMENTS

2008/0010301 A1\*    1/2008    Tian et al. ..................... 707/10

OTHER PUBLICATIONS

Presence SIMPLE Architecture OMA-AD-Presence_SIMPLE-V2_0-20071129-D http://member.openmobilealliance.org/ftp/Public_documents/PAG/Permanent_documents/ p. 13-p. 15,p. 17-19.

\* cited by examiner

*Primary Examiner* — Kyung H Shin
(74) *Attorney, Agent, or Firm* — Patent Portfolio Builders, PLLC

(57) ABSTRACT

The present invention relates to a method and devices for operating a communication network, in particular a presence SIMPLE network applying polite block and confirm for subscribers to presence data. A method for operating a communication system comprising a presence server and a presence document server is provided, the communication system being adapted to communicate with a first client requesting subscription to the presence data of a presentity using a second client, the method comprising the steps of: sending, in case the subscription is to be confirmed or politely blocked, a request for presence data from the presence server to the presence document server; receiving a message comprising presence data of the presentity from the presence document server; and sending a notification message to the first client based on the received presence data of the presentity.

12 Claims, 11 Drawing Sheets

PERMANENT PRESENCE FOR POLITE BLOCK AND CONFIRM

TECHNICAL FIELD

The present invention relates to a method and devices for operating a communication network, in particular a presence SIMPLE network applying polite block and confirm for subscribers to presence data.

BACKGROUND

Communication services experience an immense development both in the number of available services, such as online gaming, chatting, etc., as well as the number of users of these services.

In current communication networks that are based on Presence SIMPLE (SIP for Instant Messaging and Presence Leveraging Extensions), e.g. as specified in the Open Mobil Alliance Presence SIMPLE Specification (OMA-TS-Presence_SIMPLE-V2_0-20071128-D) of 28 Nov. 2007, a watcher subscribing to presence information of a presentity sends a subscription message to a presence server, optionally via a resource list server, and the presence server responds according to the authorization rules of the presentity.

If the result of the evaluation of the subscription authorization rules is to perform polite-blocking or confirm, the presence server sends a notification to the watcher comprising default presence data (presentity "unavailable" and "unwilling") or no presence data, respectively, precluding a presentity's from personalizing notifications to watcher and thereby limiting user friendliness of the presence services.

SUMMARY

Accordingly, there is a need for a method and devices for increasing the user friendliness of a communication network using presence.

In order to solve the above-mentioned and other problems, a method for operating a communication system comprising a presence server and a presence document server is provided, the communication system being adapted to communicate with a first client requesting subscription to the presence data of a presentity using a second client, the method comprising the steps of: sending, in case the subscription is to be confirmed or politely blocked, a request for presence data from the presence server to the presence document server; receiving a message comprising presence data of the presentity from the presence document server; and sending a notification message to the first client based on the received presence data of the presentity.

The present invention provides improved user friendliness from both a watcher's view and a presentity's view by enabling notifications regarding polite block and confirm to comprise personalized presence data from a presentity.

Furthermore, a presence server for a communication system comprising a presence server and a presence document server is provided, the communication system being adapted to communicate with a first client requesting subscription to the presence data of a presentity using a second client, wherein the presence server: is adapted to send, in case the subscription is to be confirmed or politely blocked, a request for presence data to the presence document server; is adapted to receive a message comprising presence data of the presentity from the presence document server; and is adapted to send a notification message to the first client based on the received presence data of the presentity.

According to a further aspect of the present invention, a presence document server for a communication system comprising a presence server and a presence document server is provided, the communication system being adapted to communicate with a client, wherein the presence document server: is adapted to receive a request for presence data of a presentity; is adapted to select presence data depending on the request, wherein the presence data includes first presence data in case the request indicates confirm and second presence data in case the request (202, 208) indicates polite block; and is adapted to send a message comprising the selected presence data to the presence server.

Furthermore, a client, e.g. a watcher, for a communication system comprising a presence server and a presence document server, the communication system being adapted to communicate with the client is provided, wherein the client comprises a display and is adapted to send a subscription request for a presentity to the presence server; is adapted to receive, in case the subscription is to be confirmed or politely blocked, a notification message comprising presence data of the subscribed presentity; and is adapted to present the received presence data on a display of the client.

The watcher client may be any entity in the communication network implementing a watcher, e.g. an Application Server or a User Equipment, and may be embodied in or run on e.g. a mobile terminal, a PDA, a laptop, a personal computer, a server or any other suitable equipment.

Preferably, the method according to the invention is implemented in a computer comprising a processor. Accordingly, a computer program product for communicating messages in a communication system comprising a presence server and a presence document server, the communication system being adapted to communicate with a first client requesting subscription to the presence data of a presentity using a second client is provided. The computer program product comprises computer program code which, when run on a computer, sends a request for presence data from the presence server to the presence document server when the subscription is to be confirmed or politely blocked, computer program code which, when run on a computer, can receive a message comprising presence data of the presentity from the presence document server, and computer program code which, when run on a computer, sends a notification message to the first client based on the received presence data of the presentity.

According to a further aspect of the present invention, a client is provided, the client enabling a presentity desiring to personalize notifications sent to watchers subscribing to presence data of the presentity in case the watcher is to be confirmed or politely blocked to set and/or adjust the content of these notifications. Accordingly, a client for a communication system comprising a presence server and a presence document server, the communication system being adapted to communicate with the client is provided, wherein the client is adapted to send a message to the presence document server, wherein the message comprises permanent presence data to be sent to a subscriber in case the subscriber is to be politely blocked or confirmed.

The presentity client may be any entity in the communication network transmitting presence information such as a Presence Source, e.g. a Presence User Agent (PUA), a Presence Network Agent (PNA), or a Presence External Agent (PEA). The presentity client may be embodied in or run on e.g. a mobile terminal, a PDA, a laptop, a personal computer, an application server or other servers or any other suitable equipment.

The basic idea of the present invention is to let a presentity personalize the presence information to be distributed to watchers that are politely blocked or when a subscription from the watcher is set to the pending state.

The present invention is in particular intended for use in a presence SIMPLE based communication network, such as an IMS (IP Multimedia Subsystem) and/or an OMA (Open Mobile Alliance) system. However, the present invention may be implemented in any communication system or network employing presence.

BRIEF DESCRIPTION OF THE DRAWINGS

The above and other features and advantages of the present invention will become readily apparent to those skilled in the art by the following detailed description thereof, in particular by detailed description of exemplary embodiments thereof with reference to the accompanying drawings, in which.

DETAILED DESCRIPTION

Figure 1:
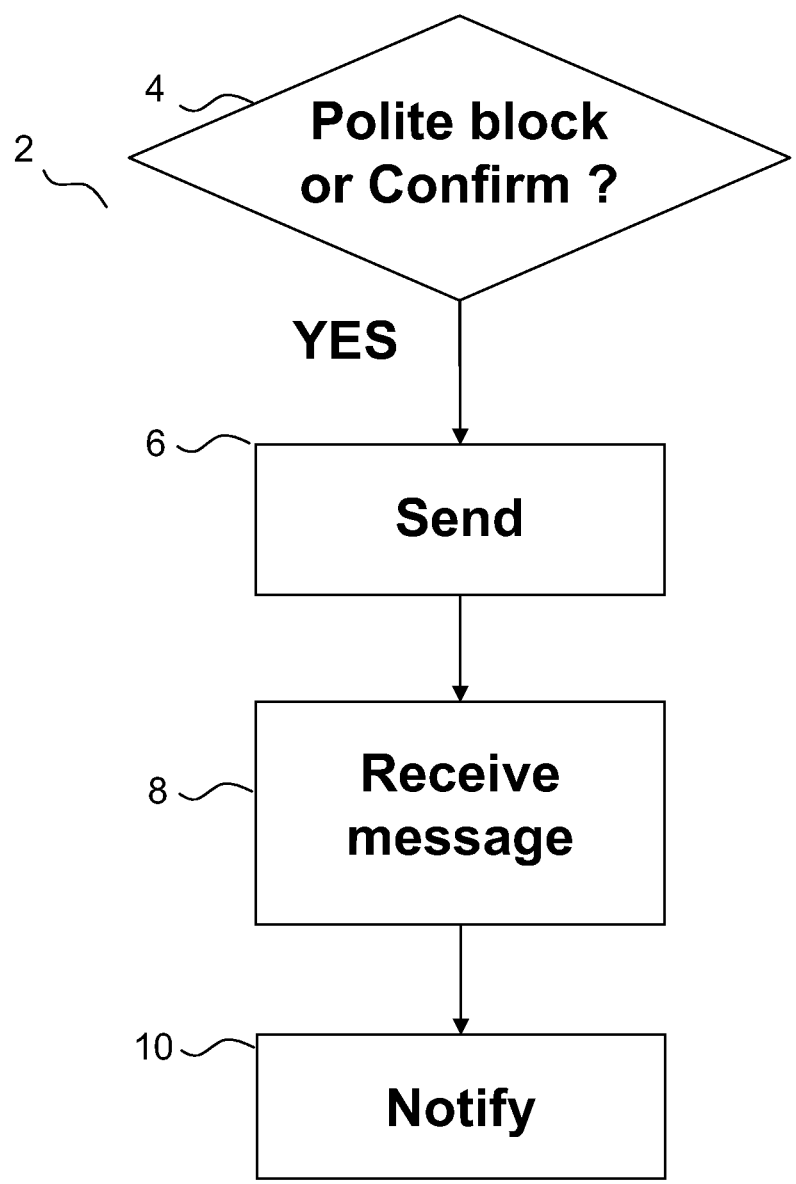
FIG. 1 illustrates an embodiment of the method according to the invention.

The figures are schematic and simplified for clarity, and they merely show details which are essential to the understanding of the invention, while other details have been left out. Throughout, the same reference numerals are used for identical or corresponding parts.

FIG. 1 illustrates an embodiment of the method according to the present invention. The method 2 for operating a communication system comprising a presence server and a presence document server, wherein the communication system (100) being adapted to communicate with a first client requesting subscription to the presence data of a presentity using a second client, comprises the step 4 of determining whether the subscription request is to be politely blocked or confirmed. If that is the case, the method proceeds to step 6 of sending a request for presence data from the presence server to a document server, e.g. the presence server or a permanent presence document server. Then the method proceeds to step 8 of receiving a message comprising presence data of the presentity from the document server, e.g. from the presence document server or from the permanent presence document server. If the subscription is to be confirmed, the message comprising presence data may comprise presence data of the presentity for the pending state. If the subscription is to be politely blocked, the message comprising presence data may comprise presence data of the presentity for the polite block state. The presence data may be selected from a first presence document with presence data for polite block and from a second presence document with presence data for confirm. Upon receipt of the message comprising presence data of the presentity, the method according to the invention proceeds to step 10 of sending a notification message to the first client based on the received presence data of the presentity.

The notification message may comprise at least a part of the presence data received in the step of receiving a message. In an embodiment, the notification message comprises preconfigured presence data that are selected according to presence data received in the step of receiving a message.

In the method 2, the step 10 of sending a notification message comprises sending the presence data received in the step 8 of receiving a message.

Figure 2:
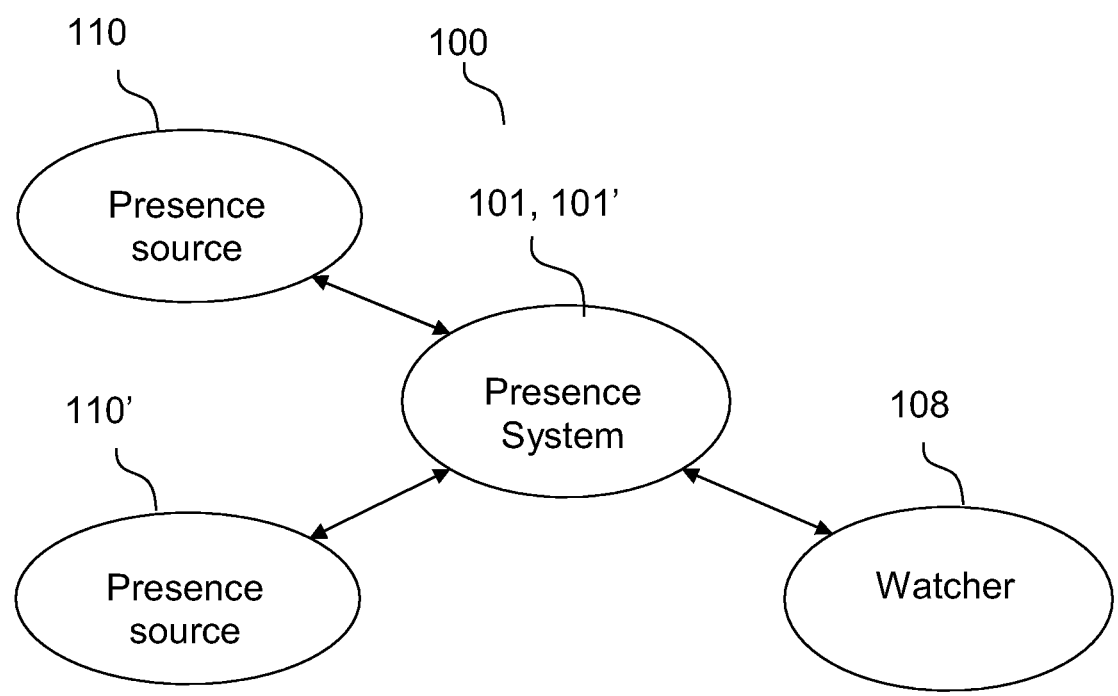
FIG. 2 schematically illustrates a communication network applying the method according to the present invention, FIG. 3 schematically illustrates a communication network applying the method according to the present invention, FIG. 4 schematically illustrates a communication network applying the method according to the present invention

In FIG. 2, a communication network applying the method according to the present invention is schematically illustrated. The communication network 100 is an IETF SIMPLE network comprising a Presence System 101, 101' implementing presence functionality and communicating with one or more Watchers/clients 108 and one or more Presence Sources/clients 110, 110' as illustrated by the double arrows, e.g. via SIP and/or XCAP. The present invention provides a high degree of freedom for a presentity to personalize notifications sent to watchers and enabling a presentity or user to adapt these notifications according to personal desires.

Figure 3:
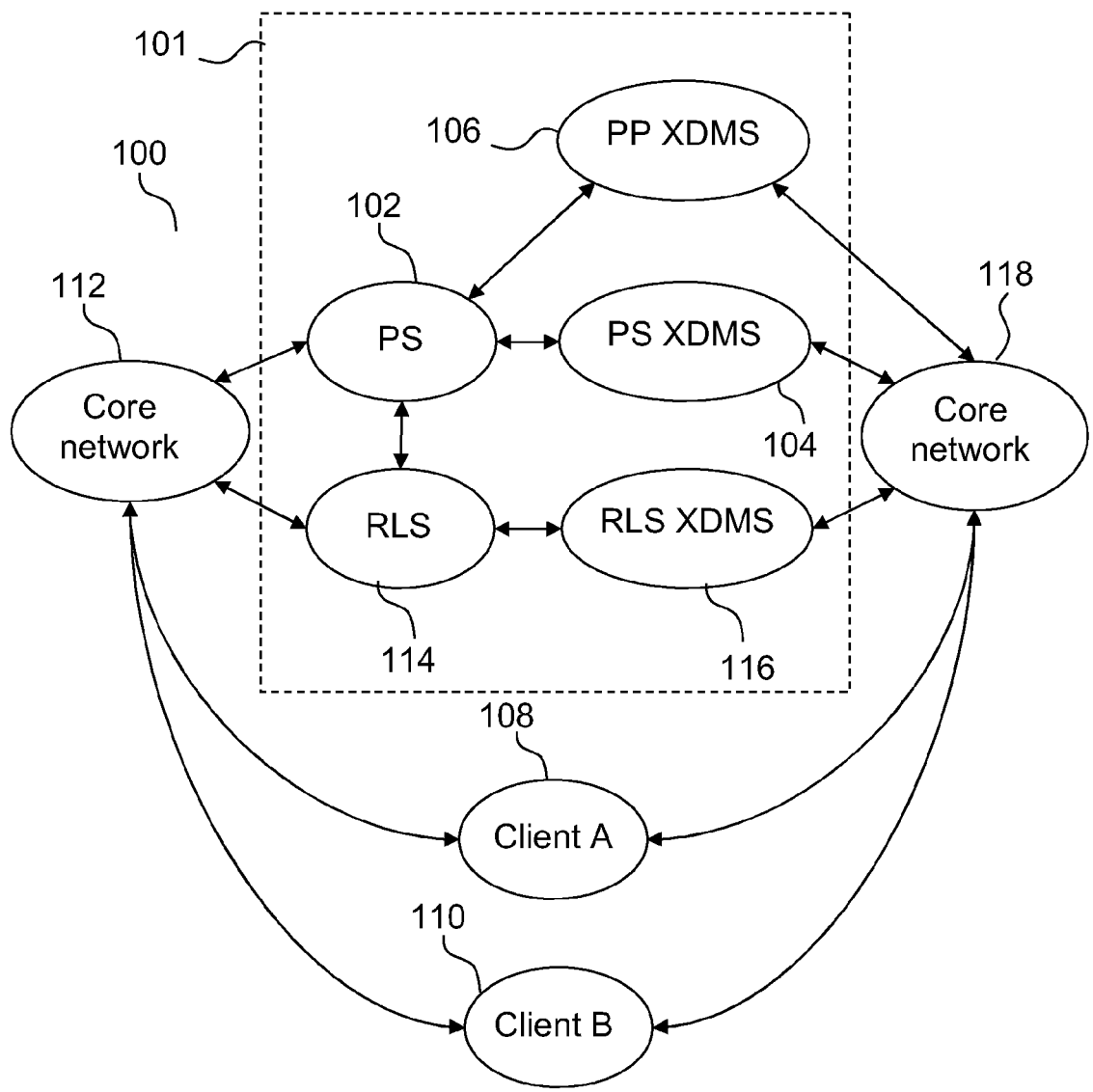

FIG. 3 schematically illustrates an embodiment of the network in FIG. 2. The communication network 100 comprises presence system 101 implementing presence functionality and applying the method according to the present invention. The Presence System 101 comprises a presence server (PS) 102, a presence authorization document server (PS XDMS) 104, a permanent presence document server (PP XDMS) 106, a resource list server (RLS) 114, and a resource list document server (RLS XDMS) 116. The Presence Server 102 communicates with entities comprising Watcher 108 (Client A) and Presence Source 110 (Client B) via core networks 112, e.g. adapted for SIP and including a CSCF. Further, Presence Source 110 may update presence documents, presence rules and authorizations in PS XDMS 104 and PP XDMS 106, e.g. by sending XCAP messages, via core network 118.

The Presence Server (PS) 102 is an entity that accepts, stores and distributes presence information by handling publications from Presence Source(s) 110 of presentities, composing presence information from Presence Source(s) 110, handling subscriptions from Watchers 108 to presence information, and updating presence information when changes occur. The Presence Server 102 exchanges information with presence authorization document server (PS XDMS) 104 and permanent presence document server (PP XDMS) 106 that are XML Document Manipulation Servers including databases for storage of documents related to presentities, e.g. subscription authorization rules, permanent presence data and presence content rules for watchers. The Presence System 101 optionally further comprises a resource list server (RLS) 114 which accepts and manages subscriptions to presence lists, thereby enabling a Watcher to subscribe to multiple presentities by using only a single subscription transaction. The RLS 114 stores and retrieves presence lists of watchers in the RLS XDMS 116 comprising a database for storing presence lists.

Figure 4:
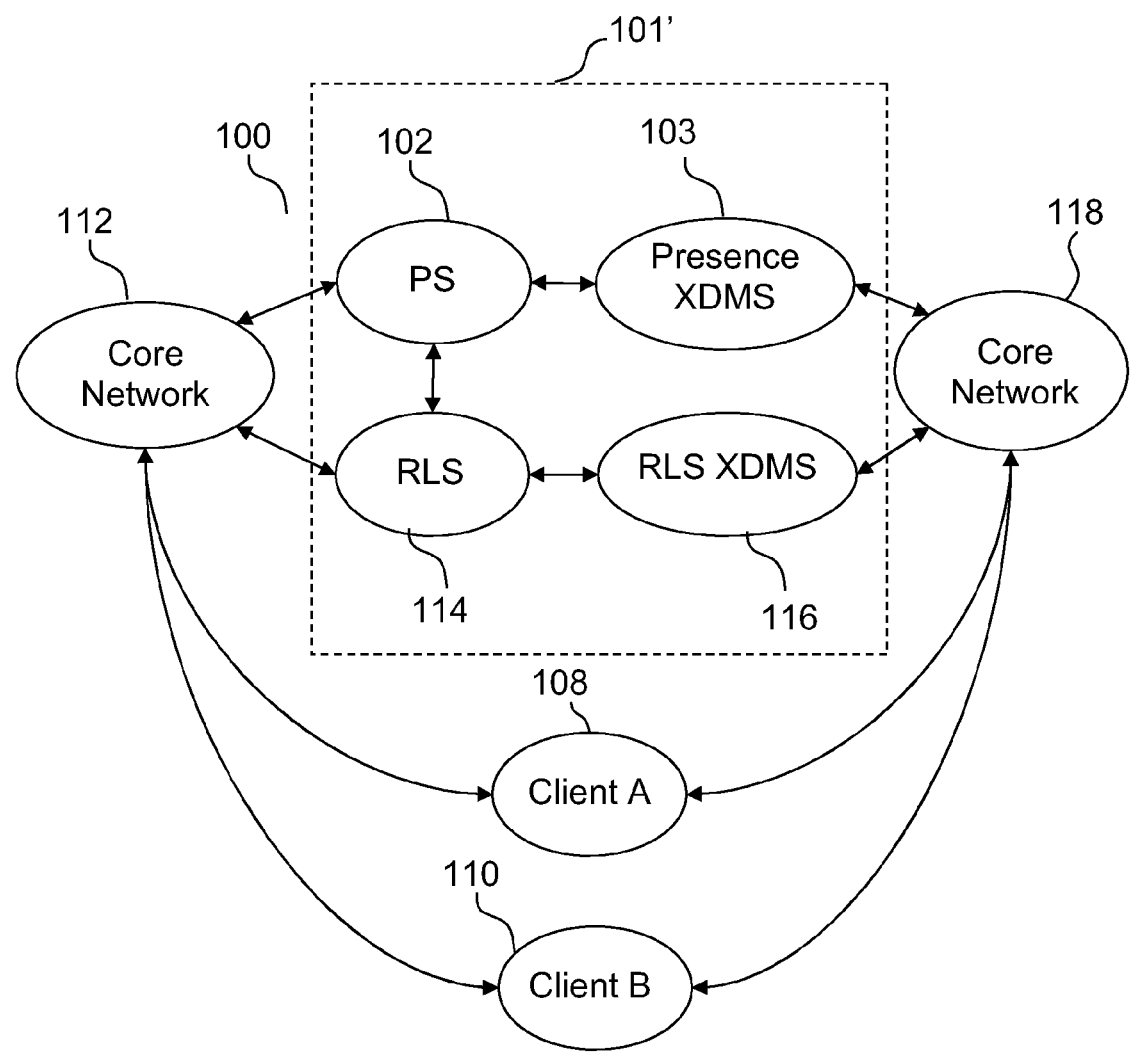

FIG. 4 illustrates an embodiment of the network in FIG. 2. In the presence system 101', the PS XDMS 104 and PP XDMS 106 are merged into a single presence document server (Presence XDMS) 103.

Figure 5:
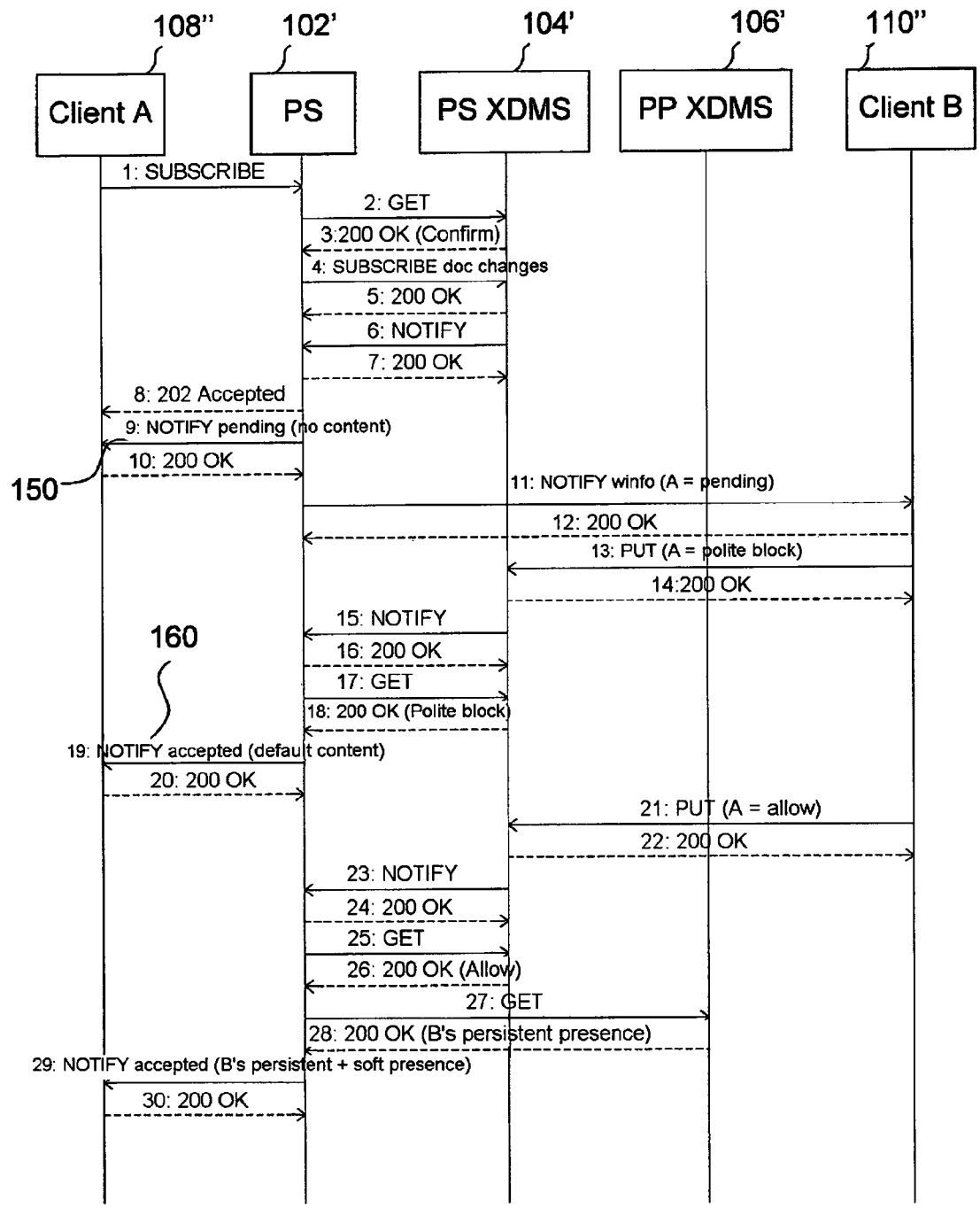
FIG. 5 illustrates prior art signalling between entities in the communication network of FIG. 3.

FIG. 5 illustrates signaling in a prior art communication system adapted for presence. When a subscription is to be confirmed, the presence server 102' sends a notification message 150 notifying pending state but with no presence data. When a subscription is to be politely blocked, the presence server 102' sends a notification message 160 comprising default presence data "unavailable" and "unwilling".

Figure 6:
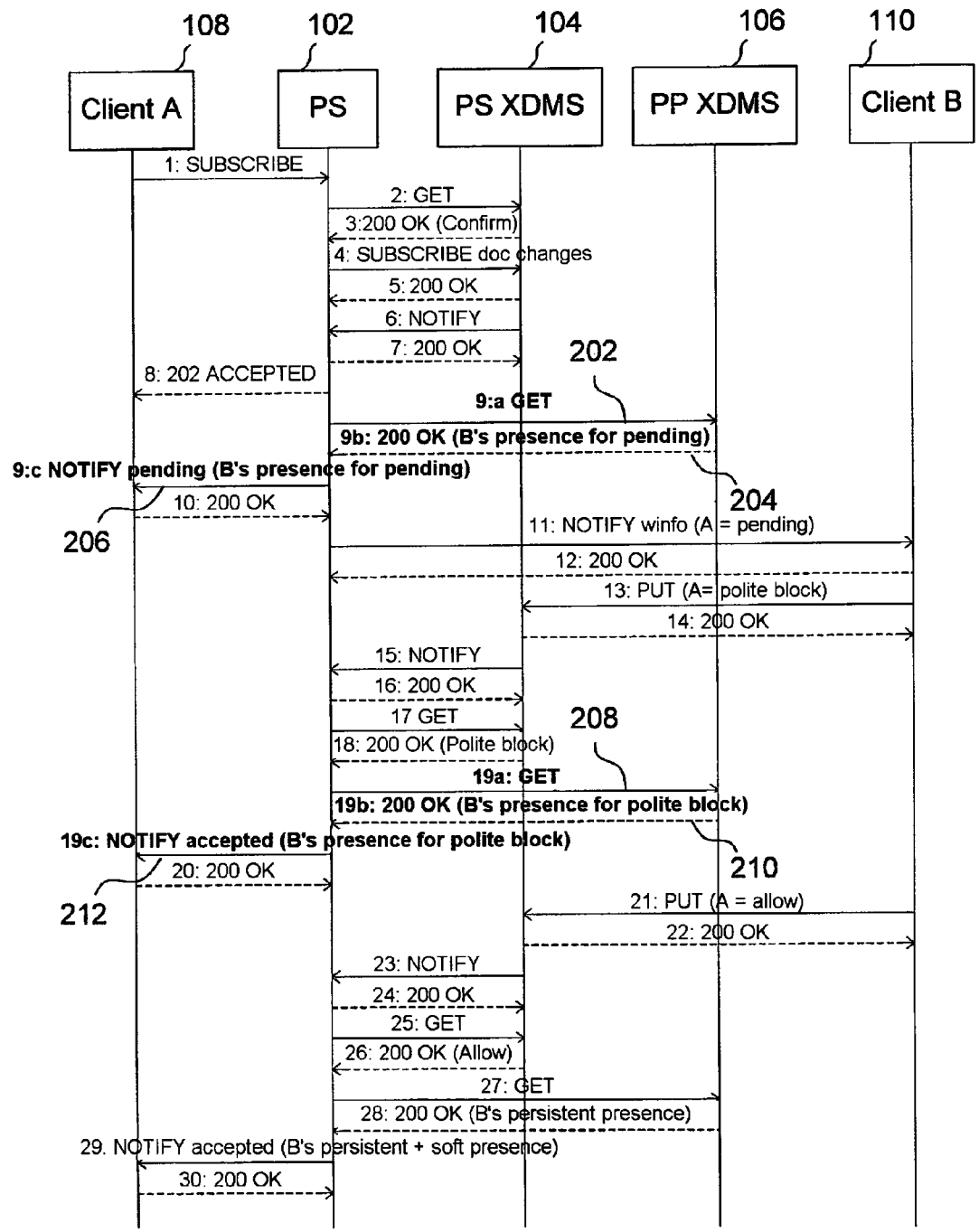
FIG. 6 illustrates signalling between entities in the communication network of FIG. 3.
Figure 7:
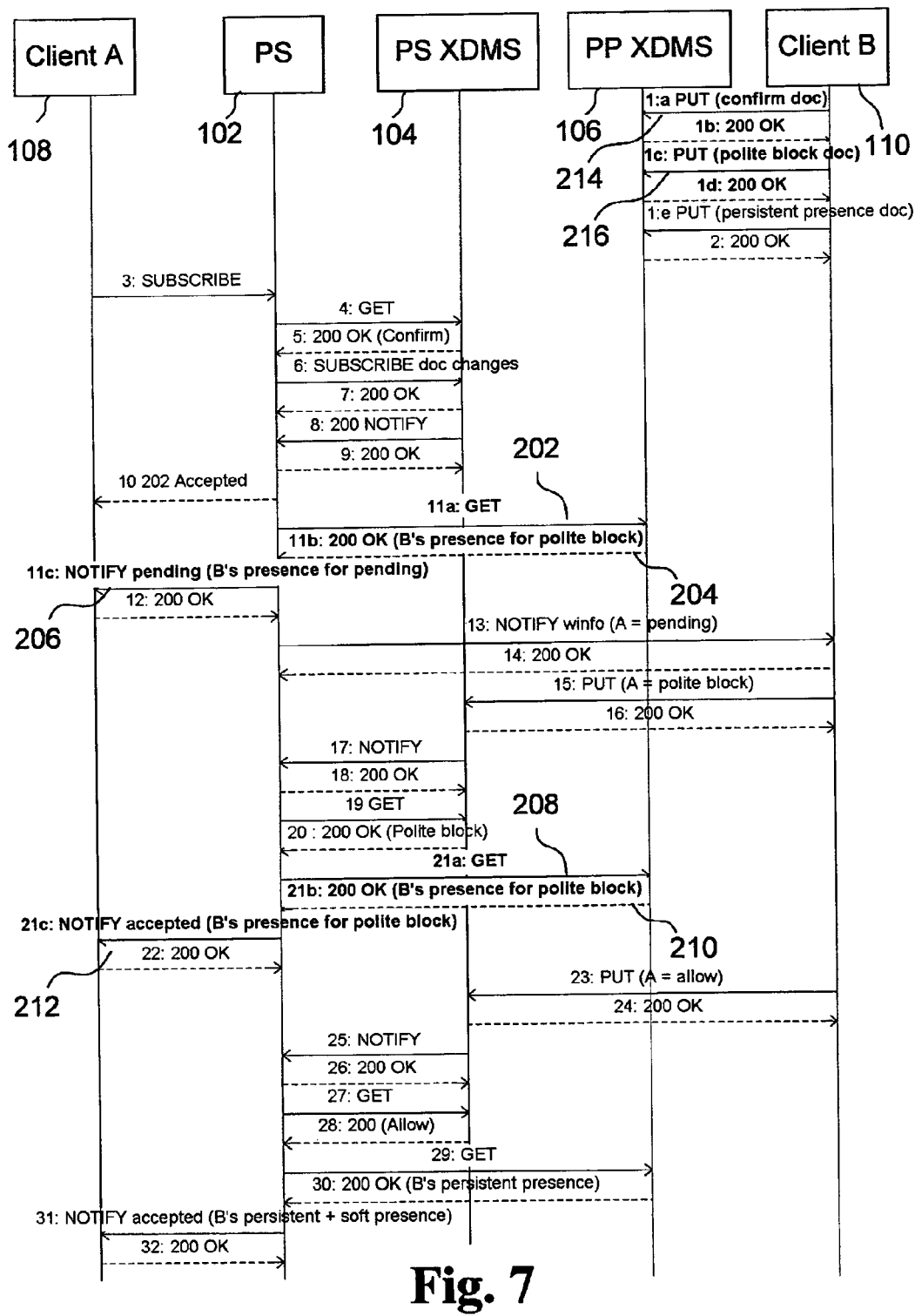
FIG. 7 illustrates signalling between entities in the communication network of FIG. 3, and FIGS. 8-11 are block diagrams schematically illustrating entities according to the invention.

FIG. 6 and FIG. 7 illustrate signaling according to an embodiment of the present invention. A watcher using client A 108 subscribes to presence data of presentity using client B 110 by sending a subscription message, e.g. a SIP SUBSCRIBE, to the presence server 102. The presence server 102 determines that the subscription is to be confirmed by sending a GET message to the PS XDMS 104 which informs according to authorization scheme. The presence server 102 then sends a request 202 for presence data to the presence document server holding presence data for pending, in this case PP XDMS 106. In another embodiment, the request 202 is sent to the presence XDMS 103. The request 202 may be an XCAP GET message, however other protocols may be applied for communication between the presence server 102 and the presence document server. Upon receipt of the request, PP XDMS 106 determines the presentities presence data, e.g. permanent presence data, for pending and sends message 204 to the presence server 102, wherein the message 204 comprises the presentity's presence data for pending. PS 102 receives the message 204 and sends a notification message 206 to client A 108 comprising at least a part of the presentity's presence data for pending. Client A 108 receives the notification 206 and presents the received presence data on a display of client A 108. In an embodiment, the presence server 102 may determine the content of the notification 206 by selecting presence data from a preconfigured set of presence data depending on the presence data in message 204.

PP XDMS 106 may select the presentity's presence data for pending in message 204 according to a permanent presence document for pending or according to preconfigured presence data in case PP XDMS 106 does not hold a presence document for pending for the presentity in question. In an embodiment of the present invention, the PP XDMS 106 may notify the presence server 102 if the PP XDMS is not able to find a document, e.g. by sending a "404 Not Found" message, and the presence server 102 may notify the watcher 108 according to preconfigured presence data for pending in the presence server 102.

If the presence server 102 determines that the subscription request from client A 108 is to be politely blocked, the presence server 102 sends a request 208 for presence data to the presence document server holding presence data for polite block, in this case PP XDMS 106. In another embodiment, the request 208 is sent to the presence XDMS 103. The request 208 may be an XCAP GET message, however other protocols may be applied for communication between the presence server 102 and the presence document server in question. Upon receipt of the request, PP XDMS 106 determines the presentities presence data, e.g. permanent presence data, for polite block and sends message 210 to the presence server 102, wherein the message 210 comprises the presentity's presence data for polite block. Presence server 102 receives the message 210 and sends a notification message 212 to client A 108 comprising at least a part of the presentity's presence data for polite block. Client A 108 receives the notification 212 and presents the received presence data on a display of client A 108. In an embodiment, the presence server 102 may determine the content of the notification 212 by selecting presence data from a preconfigured set of presence data depending on the presence data in message 210.

PP XDMS 106 may select the presentity's presence data for polite block in message 210 according to a permanent presence document for polite block or according to preconfigured presence data in case PP XDMS 106 does not hold a presence document for polite block for the presentity in question. In an embodiment of the present invention, the PP XDMS 106 may notify the presence server 102 if the PP XDMS is not able to find a document, e.g. by sending a "404 Not Found" message, and the presence server 102 may notify the watcher 108 according to preconfigured presence data for polite block in the presence server 102.

The request 202, 208 for presence data may indicate which presence data are requested, e.g. presence data for pending in case the subscription request is to be confirmed or presence data for polite block in case the subscription request is to be politely blocked. Additionally, or alternatively, the request 202, 208 for presence data may identify the watcher/first client subscribing to presence data.

The presence data for pending and polite block may depend on the identity of the watcher.

The presence document server as illustrated by 103 in FIG. 4 may be divided into two or more separate document servers, e.g. as illustrated by 104, 106 in FIG. 3. In and embodiment the presence document server may comprise a presence authorization document server handling, e.g. authorization rules, and a permanent presence document server handling permanent presence documents. Presence documents on the presence server, the authorization document server, and the permanent presence document server may be updated by a presentity using a client.

FIG. 7 further illustrates setting presence data for pending and polite block. According to the invention, the presentity using client B 110 sends a message 214, 216 to the PP XDMS 106, wherein the message comprises permanent presence data to be sent to a subscriber in case the subscriber in question or subscribers in general are to be politely blocked or confirmed. In the illustrated embodiment, client B 110 sends a first message 214 to the PP XDMS 106, wherein the first message 214 comprises permanent presence data for the pending state or in case the subscription is to be confirmed. Furthermore, client B 110 sends a second message 216 to the PPXDMS 106, wherein the second message comprises permanent presence data to be sent to a subscriber in case the subscriber is to be politely blocked. The presence data of the first message 214 and the second message 216 may be different.

Figure 8:
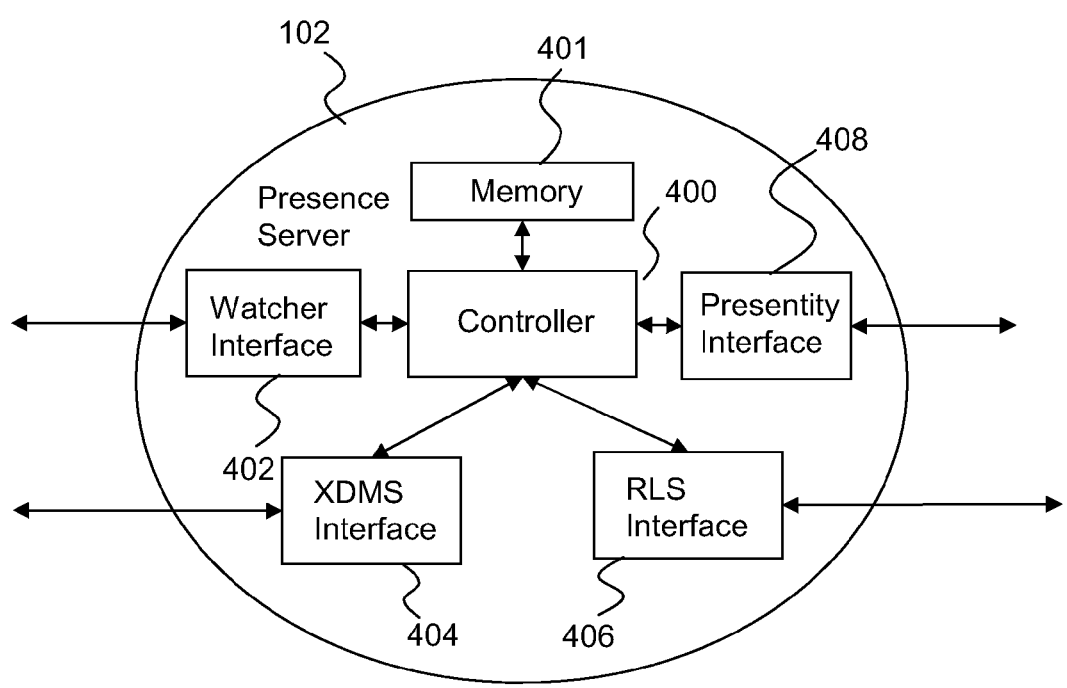

FIG. 8 is a function block diagram schematically illustrating a non limiting embodiment of the presence server 102 according to the invention. The presence server 102 comprises a controller 400 for controlling and coordinating the operation of the presence server. The controller 400 is adapted to control timing, type and content of messages sent to other entities in the system according to the present invention and is coupled to a memory 401 in the presence server 102. Further, the presence server 102 includes a watcher interface 402, a XDMS interface 404, optional RLS interface 406, and a presentity interface 408. The controller 400 is coupled to the watcher interface 402 that is adapted to send and receive messages to or from a watcher 108 connected to the communication network. Further, the controller 400 is coupled to the XDMS interface 404 that is adapted to send and receive messages to or from XDMS's 103, 104, 106 in the presence system 102. The controller 400 is adapted to send a request for presence data to the presence document server 103, 106 via XDMS interface 404 in case a subscription from the watcher 108 is to be confirmed or politely blocked. Further, the controller is adapted to receive a message comprising presence data of the presentity from the presence document server 103, 106 from the XDMS interface 404. In response to the received message from the document server 103, 106, the controller 400 is adapted to send notifications via the watcher interface 402 to the watcher or first client 108, the notifications comprising presence data for pending state or presence data for polite block according to the invention.

Further, the controller 400 may be coupled to an RLS interface 406 enabling the presence server 102 to communicate with the optional RLS 114 in the presence system 101, 101'. The presentity interface 408 is coupled to the controller 400 and enables communication with presentities by sending and receiving messages to or from presentities connected to the communication network. One or more of the interfaces 402, 404, 406, 408 to other entities may be combined into one interface, e.g. the watcher interface 402 and the presentity interface 408.

Figure 9:
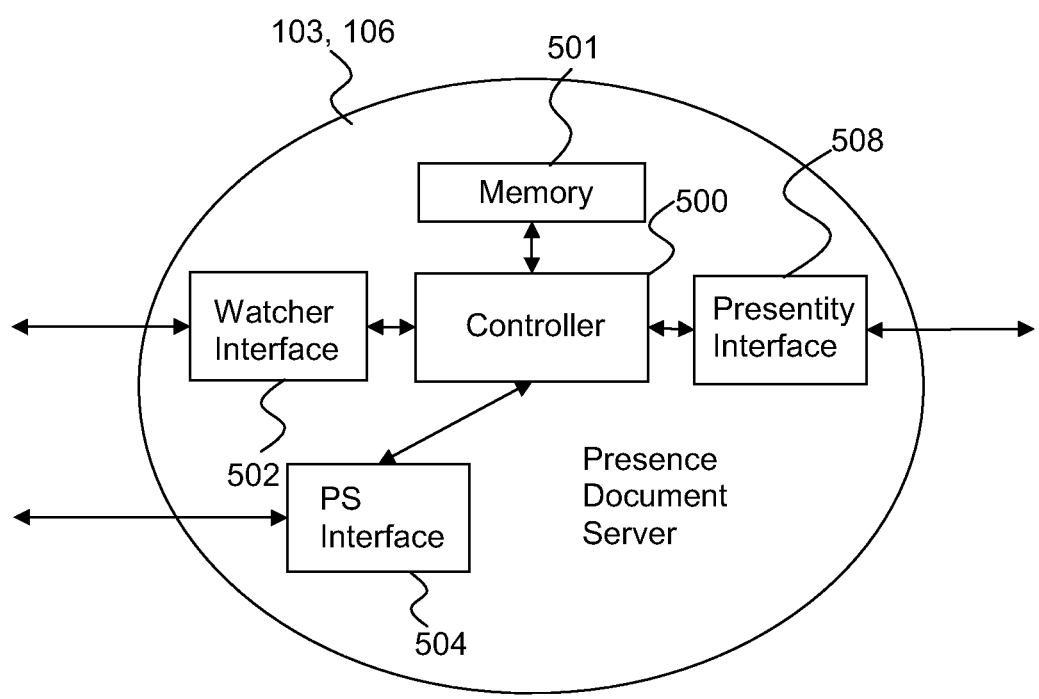

FIG. 9 is a function block diagram schematically illustrating a non limiting embodiment of the presence document server 103, 106 according to the invention. The presence document server 103, 106 comprises a controller 500 for controlling and coordinating the operation of the presence document server 103, 106. The controller 500 is adapted to control timing, type and content of messages sent to other entities in the system according to the present invention and is coupled to a memory 501 in the presence document server 103, 106. Further, the presence document server 103, 106 includes a watcher interface 502, a presence server (PS) interface 504, and a presentity interface 508. The controller 500 is coupled to the watcher interface 502 that is adapted to send and receive messages to or from a watcher 108 connected to the communication network. The controller 500 is adapted to receive a request for presence data of a presentity via the presence server interface 504, and then selecting presence data, e.g. from the memory 501, depending on the request. The selected presence data includes first presence data in case the request indicates confirm and second presence data in case the request indicates polite block. Furthermore, the controller is adapted to send a message to the presence server 102 via presence server interface 504, wherein the message comprises the selected presence data.

Furthermore, the presentity interface 508 is coupled to the controller 500 whereby the presence document server 103, 106 is adapted to receive presence data for confirm and presence data for polite block. The controller 500 is adapted to receive the presence data for confirm and presence data for polite block and is adapted to store the presence data, e.g. in separate documents, in the memory 501.

Figure 10:
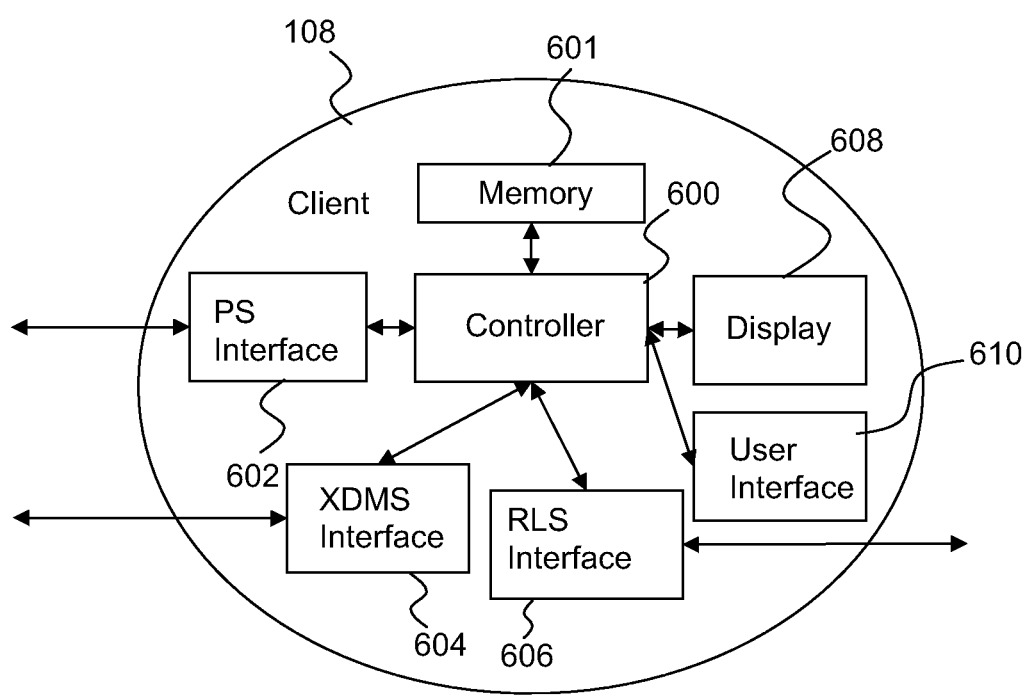

FIG. 10 is a function block diagram schematically illustrating a non limiting embodiment of the client 108 according to the invention. The client 108 comprises a controller 600 for controlling and coordinating the operation of the client 108. The controller 600 is adapted to control timing, type and content of messages sent to other entities in the system according to the present invention and is coupled to a memory 601 in the client 108. Further, the client 108 includes a presence server (PS) interface 602, a XDMS interface 604, and optionally a RLS interface 606. The controller 600 is coupled to the presence server interface 602 that is adapted to send and receive messages to or from a presence server 102 in the communication network. Further, the controller 600 is coupled to the XDMS interface 604 enabling the watcher to communicate with document servers, e.g. optional RLS XDMS 116, in the communication network. The controller 600 is adapted to send a subscription request for a presentity to the presence server 102 via the presence server interface 602. In an embodiment of the invention, the subscription request is sent to the presence server 102 via an RLS 114 in the presence network by using an RLS interface 606 in the client. Further, the controller 600 is adapted to receive a notification message from the presence server 102 via the presence server interface 602 or optional RLS interface 606, the notification comprising presence data of the subscribed presentity in case the subscription is to be confirmed or politely blocked. Further, the client 108 comprises a display 608, and the controller 600 is adapted to present the received presence data on the display 608 of the client 108. The client 108 may further comprise a user interface 610 enabling a user to control the client 108. The client 108 may be a mobile terminal.

Figure 11:
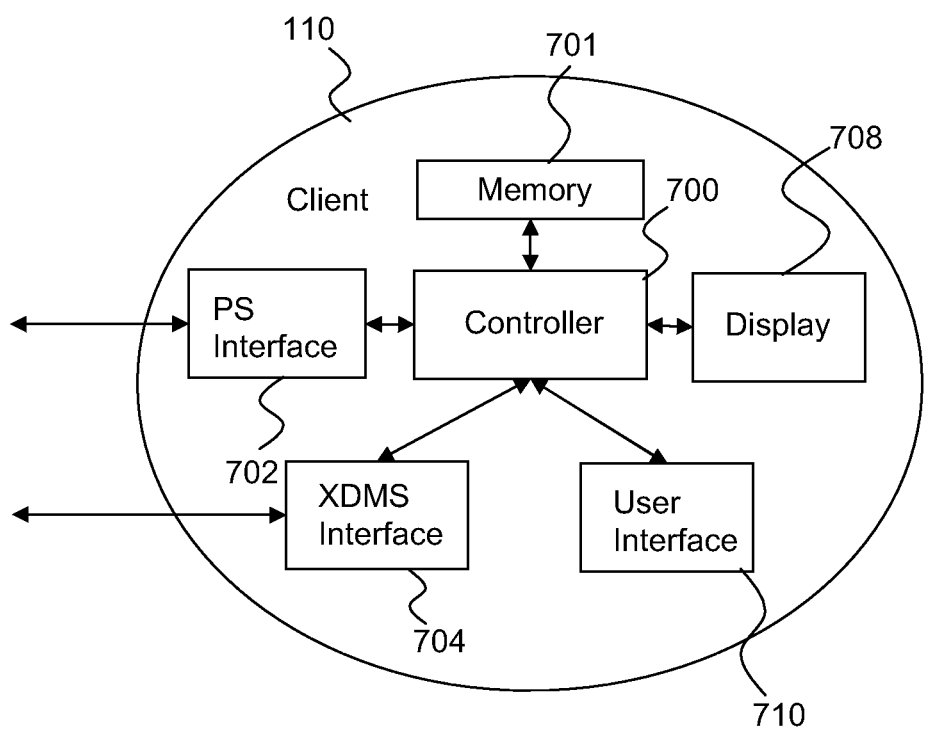

FIG. 11 is a function block diagram schematically illustrating a non limiting embodiment of the client 110 according to the invention. The client 110 comprises a controller 700 for controlling and coordinating the operation of the client 110. The controller 700 is adapted to control timing, type and content of messages sent to other entities in the system according to the present invention and is coupled to a memory 701 in the client 110. Further, the client 110 comprises a presence server (PS) interface 702, and XDMS interface 704. The controller 700 is coupled to the presence server interface 702 that is adapted to send and receive messages to or from a presence server 102 in the communication network. Further, the controller 700 is coupled to the XDMS interface 704 enabling a presentity using the client 110 to communicate with document servers, e.g. document servers 103, 104 and 106, in the communication network. The controller 700 is adapted to send a message to the presence document server 103, 106 via the XDMS interface 704, wherein the message comprises permanent presence data to be sent to a subscriber in case the subscriber is to be politely blocked or confirmed. The controller 700 may be adapted to send a first message to the presence document server 103, 106, wherein the first message comprises permanent presence data to be sent to a subscriber in case the subscriber is to be confirmed, and/or the controller 700 may be adapted to send a second message to the presence document server 103, 106, wherein the second message comprises permanent presence data to be sent to a subscriber in case the subscriber is to be politely blocked. The client 110 may be a mobile terminal. The client 110 may further comprise a display 708 and a user interface 710 enabling a user to control the client 110.

In an embodiment of the present invention the client 108 and the client 110 are embodied in a single client.

In an embodiment of the present invention, the presentity can use relative presence in the "polite-block" and "confirm" documents, just as relative presence can be used in the permanent presence and soft state presence documents today. The presentity may use the relative presence feature by including a <class> element in the presence documents and the authorization rules document. In this way the presentity can specify which class of presence data a specific class of watchers shall be able to see.

The present invention suggests an extension of the presence system according to OMA by allowing a presentity to create presence documents, e.g. permanent presence documents, to be used in connection with the two subscription authorization rules "polite block" and "confirm". A document server in the presence system, e.g. a presence document server, such as Presence XDMS (defined in OMA Presence SIMPLE V.2) or a permanent presence document server, should allow a user to create a first presence document with for example name "polite-block" and a second presence document with for example name "confirm", where the presence documents comprise presence information, optionally depending on watcher identities and/or attributes to be notified, to be sent to watchers subscribing to presence data of the presentity.

The different entities, e.g. watcher clients, presentity clients, the presence server, document servers, communicate via one or more protocols. These protocols may include standardized protocols such as Session Initiation Protocol (SIP, IETF RFC3261), XML Configuration Access Protocol (XCAP, IETF RFC4825) or other suitable protocols.

It should be noted that in addition to the exemplary embodiments of the invention shown in the accompanying drawings, the invention may be embodied in different forms and should not be construed as limited to the embodiments set forth herein. For example, the method may be performed in any presence network applying confirm and/or polite block. The embodiments illustrated herein are provided so that this disclosure will be thorough and complete, and will fully convey the concept of the invention to those skilled in the art.

The invention claimed is:

1. A presence server for a communication system comprising the presence server and a presence document server, the communication system being arranged for communicating with a first client requesting subscription to presence data of a presentity using a second client, the presence server comprising:
    an interface receiving a subscription request subscribing to the presence data of the presentity from the first client; and
    a controller and a non-transitory memory for storage of instructions that, when executed by the controller, cause the presence server to:
    determine if the subscription request is to be either confirmed or politely blocked and, in case the subscription request is to be either confirmed or politely blocked:
        send, via the interface, a request for presence data to the presence document server,
        receive, via the interface, a message comprising the presence data of the presentity from the presence document server in response to the request for presence data, and
        send, via the interface, a notification message to the first client based on the received presence data of the presentity, the notification message comprising at least a part of the presence data received in the message from the presence document server.

2. The presence server according to claim 1, wherein the presence server, if the subscription request is to be confirmed, receives a message through the interface comprising presence data of the presentity for the pending state.

3. The presence server according to claim 1, wherein the presence server, if the subscription request is to be politely blocked, receives a message at the interface comprising presence data of the presentity for the polite block state.

4. The presence server according to claim 1, wherein the presence server sends the notification message to the first client through the interface, wherein the notification message comprises predetermined presence data depending on the message received from the presence document server.

5. The presence server according to claim 1, wherein the presence document server of the communication system comprises a presence authorization document server, and a permanent presence document server, and wherein the presence server comprises the interface for sending, in case the subscription request is to be confirmed or politely blocked, the request for presence data to the permanent presence document server, and wherein the presence server is adapted to receive the message comprising the presence data of the presentity from the permanent presence document server.

6. A presence document server for a communication system comprising a presence server and the presence document server, the communication system being adapted to communicate with a client, wherein the presence document server comprises:
    an interface which receives a request for presence data of a presentity from the presence server; and
    a controller and a non-transitory memory for storage of instructions that, when executed by the controller, cause the presence document server to:
    receive, via the interface, the request for presence data of the presentity,
    select the presence data depending on the request, wherein the presence data includes first presence data in case the request indicates confirm and second presence data in case the request indicates polite block, and
    send, via the interface, a message comprising the selected presence data to the presence server.

7. A client for a communication system comprising a presence server and a presence document server, the communication system being adapted to communicate with the client, the client comprising:
    an interface for sending a subscription request for presence data of a presentity to the presence server,
    the interface for receiving, in case the subscription request is to be confirmed or politely blocked, a notification message comprising the presence data of the subscribed presentity, and
    a controller and a non-transitory memory for storage of instructions that, when executed by the controller, cause the client to present the received presence data on a display of the client.

8. The client according to claim 7, wherein the client is a mobile terminal.

9. A computer program product for communicating messages in a communication system that comprises a presence server and a presence document server, the communication system arranged for communicating with a first client, requesting subscription to presence data of a presentity using a second client, wherein the computer program product comprises computer program code stored in a non-transitory memory, which, when run on a computer:
    receives, via a first interface, a subscription request subscribing to the presence data of the presentity from the first client; and
    determines if the subscription request is to be either confirmed or politely blocked and, in case the subscription request is to be either confirmed or politely blocked:
    sends, via a second interface, a request for the presence data from the presence server to the presence document server,
    receives, via the second interface, a message comprising the presence data of the presentity from the presence document server, and
    sends, via the first interface, a notification message to the first client based on the received presence data of the presentity, the notification message comprising at least a part of the presence data received in the step of receiving the message from the presence document server.

10. A client for a communication system comprising a presence server and a presence document server, the communication system being adapted to communicate with the client, the client comprising:
  an interface which sends messages to the presence document server; and
  a controller and a non-transitory memory for storage of instructions that, when executed by the controller, cause the client to:
  send, via the interface, a first message to the presence document server, wherein the first message comprises permanent presence data to be sent to a subscriber of presence data of the client in case the subscriber is to be at least one of politely blocked or confirmed.

11. The client according to claim 10, wherein the permanent presence data is a first set of permanent presence data to be sent to the subscriber in case the subscriber is to be confirmed, and
  wherein the instructions, when executed by the controller, further cause the client to send, via the interface, a second message to the presence document server, wherein the second message comprises a second set of permanent presence data different than the first set of permanent presence data to be sent to the subscriber in case the subscriber is to be politely blocked.

12. The client according to claim 10, wherein the client is a mobile terminal.

* * * * *